Figure 1:
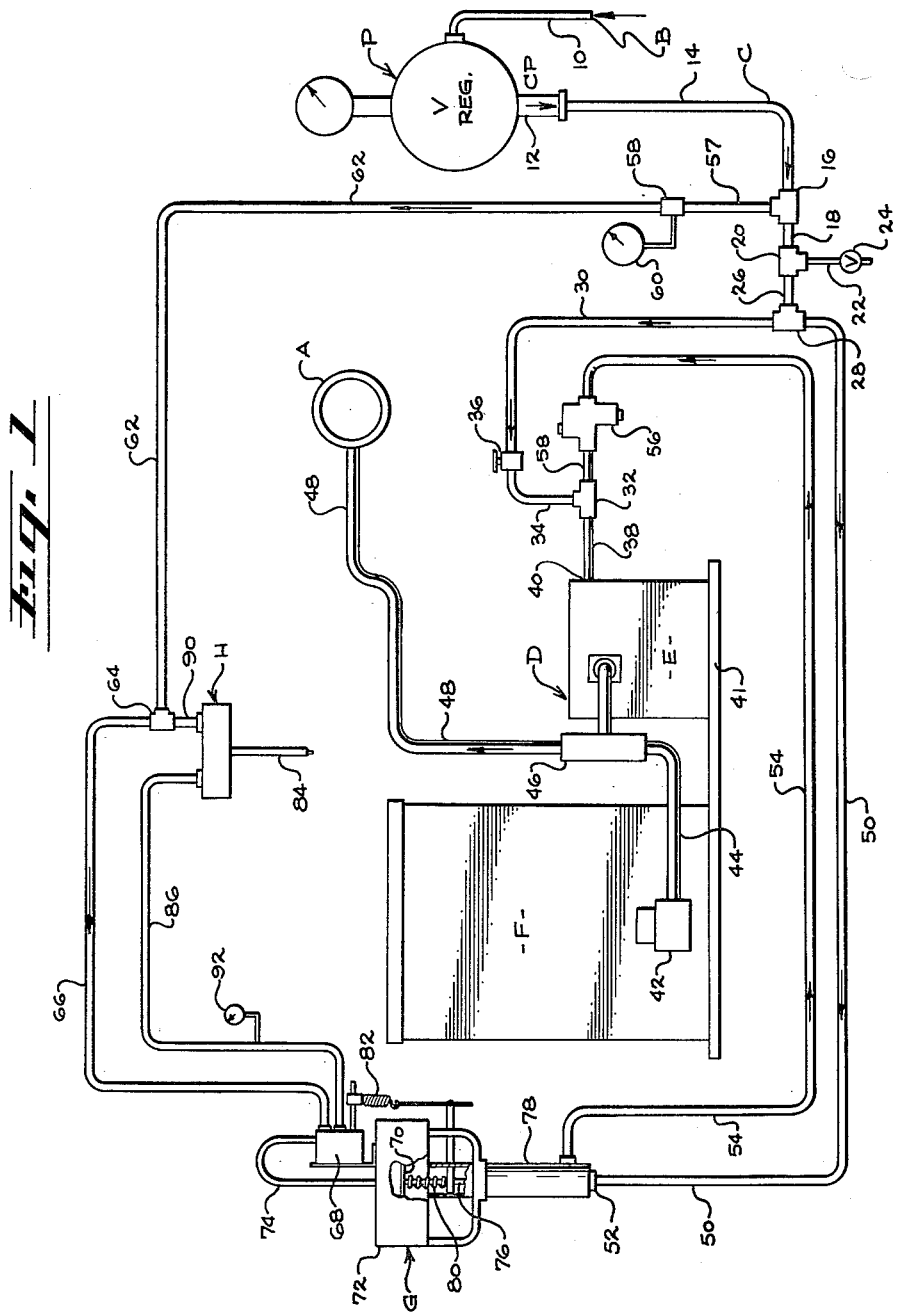

Aug. 28, 1962     C. A. OWENS     3,051,660

TEMPERATURE RESPONSIVE LIQUID DISCHARGE UNIT

Filed Nov. 16, 1959

CLYDE A. OWENS
INVENTOR

BY

William C. Babcock

ATTORNEY

# United States Patent Office 3,051,660
Patented Aug. 28, 1962

3,051,660
TEMPERATURE RESPONSIVE LIQUID
DISCHARGE UNIT
Clyde A. Owens, Box 52, Wheeler Ridge, Calif.
Filed Nov. 16, 1959, Ser. No. 853,165
4 Claims. (Cl. 252—360)

The present invention is primarily concenred with apparatus for injecting liquid treating chemicals into the flow line from an oil well, by means of which the rate of discharge of the treating chemical is progressively increased as the temperature of the ambient atmosphere decreases below a predetermined level.

In many instances, a large quantity of water, together with varying amounts of mineral matter is brought up from an oil well with the oil. Oftentimes the water is salty, and the oil-water mixture must be separated before sending the oil to a refinery. As is well known, oil and water are immiscible, and the oil-water mixture drawn from a well or group of wells is normally pumped to a separator tank where after a time the two tend to separate into different phases.

However, recovery of the oil from such a mixture in a separator tank is not quite as simple as it might seem from a description thereof. As the mixture comes from a well it is in the form of an emulsion, which must stand for a prolonged period in a storage or separation tank before the oil and water separate. However, in some instances even prolonged standing does not result in a complete separation. Needless to say a considerable investment would be involved in such tanks if prolonged standing alone were depended upon for this separation of an oil mixture or emulsion into separate oil and water phases.

To overcome these difficulties, it is customary in many oil fields to inject emulsion-breaking chemicals into the flow line leading from the wells to the separator tanks to effect more rapid separation. The chemicals used for this purpose are relatively expensive, but they are very effiecient, and only extremely small quantities need be added to the oil-water mixture as it discharges from the wells. Due to the expense of these treating chemicals, it is highly desirable to add only that quantity thereof necessary to effect a clean separation of the oil-water emulsion into separate phases of water and oil. Chemical injectors or metering pumps are normally employed to add the treating chemicals to the oil-water emulsion flowing into the separator tanks. Chemical injectors are adapted to be adjusted to the extent that but a few drops of the treating chemical are added to each barrel of the oil-water mixture discharged from a well. However, under some circumstances it is necessary to inject a substantially greater quantity of the treating chemical to each barrel of the mixture in order to effect a clean separation of the oil therefrom.

In addition to being expensive, these treating chemicals are also sensitive to the temperature of the oil and water mixture insofar as effecting a clean separation thereof into oil and water phases. In general, the warmer the oil-water mixture in the separator tank, the more effective the treating chemical is in effecting a clean separation of the mixture into separate layers of oil and water. The temperature of the oil and water mixture in the separator tank to a large extent is determined by the temperature of the ambient atmosphere.

Therefore, it will be seen that while it is a relatively simple matter to set a chemical injector to discharge a treating chemical into the flow from an oil well that is satisfactory for the prevailing temperature in the separator tank during the daytime, the treating chemical must be discharged into the flow from the well at a greater rate during the night when the temperature of the oil-water emulsion in the separator tank drops. Manual variance of the rate of the treating chemical injectors at night and again early in the morning, is not economical, for in most field operations this necessitates employment of additional personnel for this sole purpose. Furthermore, there is always the possibility of human error or omission, and the possibility that the increased rate of discharge of treating chemical that prevailed during the night will not be reduced early in the day. Failure to so reduce the rate of discharge of the treating chemical is merely a waste of this material, and increases the cost of separating the well fluid into waste water and clean oil.

It is accordingly a principal object of the present invention to provide means for introducing a selected liquid treating chemical into an oil flow line at a predetermined rate when the temperature of the ambient atmosphere is above a predetermined level, and to automatically and progressively increase the rate of flow of the treating chemical when the temperature of the ambient atmosphere falls below this level which will normally be during the night.

Another object of the invention is to provide a unit that operates automatically to at all times inject the treating chemical ino the flow of fluid from a well or wells at such a rate that an efficient separation of the liquid into oil and water phases will occur in the separator tank, irrespective of the temperature of the ambient atmosphere.

A still further object of the invention is to provide an apparatus for injecting a selected treating chemical into the flow from a well or wells at such rates that the maximum potentialities of the treating chemical are realized at minimum cost.

Yet another object of the invention is to provide means for injecting a treating chemical into the flow from a well or wells that is relatively foolproof, and one that substantially eliminates the possibility of human error or omission in adding treating chemical at the optimum rate to the fluid being treated.

These and other objects and advantages of the present invention will become apparent from the following description of a preferred form thereof, and from the accompanying drawing illustrating same, in which:

FIGURE 1 is a side elevational view of a preferred form of the invention.

With further reference to the drawing, it will be seen that a pipe A is provided that extends from the fluid discharge of an oil well or group of oil wells (not shown) to a separator tank (not shown). Oil wells and separator tanks are individually old and conventional in design, and as they have been in existence in numerous oil fields throughout the United States and the world for many years, no advantage would be achieved by illustrations thereof in the drawing.

In most oil fields a source of natural gas under pressure is available that is produced concurrently from wells with the well fluid. In illustrating the present invention such a supply of natural gas under pressure is assumed to exist at a source B. Should such a source of gas B not exist, an artificial source thereof can be easily provided, such as air that is compressed by any one of the commercially available air compressors adapted for this purpose. Such compressors may be actuated by electrical power, or driven from the prime movers used in actuating the well pumping mechanism from which the well fluid is produced.

After being reduced to a constant pressure by a pressure reducing valve P, as will hereinafter be described, the gas is supplied at a first predetermined rate of flow through a pipe C to a chemical injector D to actuate same. Although a number of commercially available chemical injectors may be used for injector D, a chemical injector, Model No. 3700 SH, manufactured by the Texstream Corporation, 320 Hughes Street, Houston, Texas, has been found to be particularly well suited for this purpose. The injector D shown in the drawing includes a gas pump E that continuously discharges liquid treating chemical from a reservoir F at all times at least at said first rate.

A normally closed, pneumatic valve G is provided that is spring-loaded at constant pressure against the gas from the reducing valve P. A valve that is well suited for this purpose is Model No. VO 58–A manufactured by the Minneapolis-Honeywell Regulator Company of 2709 Fourth Avenue, South, Minneapolis, Minnesota.

In addition, a temperature sensitive throttling valve H is provided that is responsive to the temperature of the ambient atmosphere. Valve H is closed until the temperature of the ambient atmosphere falls below a predetermined level, at which time this valve by means which will later be described, permits gas under a pressure that increases in proportion to the decrease in temperature of the ambient atmosphere to augment the force provided by the spring in valve G. As the force exerted by the spring is so augmented, the valve G opens, but the degree to which it opens is in proportion to the pressure of the gas acting thereon. This modulated opening of valve G permits a second flow of gas at constant pressure from reducing valve P to pump E. Pump E, as previously mentioned, serves to discharge the treating chemical therefrom at a rate that is related to the rate at which gas under constant pressure is supplied thereto.

Thus, it will be seen that the pump E operates continuously at a first minimum rate to discharge the treating chemical when supplied only with gas at said first rate of flow. This first rate of operation is sufficient to supply the treating chemical to the oil flow in the minimum quantity to effect a clean separation of the well fluid into oil and water while in the separation tank in a minimum time when the fluid temperature is above said predetermined level. The temperature of the well fluid in the separation tank is normally above this predetermined level during the daytime.

However, during the night as the temperature of the ambient atmosphere and that of the well fluid in the separation tank decreases, the pump E automatically starts to increase the rate of flow of the treating chemical when the temperature of the ambient atmosphere falls below said predetermined level. This increase in the rate of flow of the treating chemical compensates for its decreasing effectiveness in causing separation of the well fluid into the water and oil phases as the temperature of the well fluid decreases. When the temperature of the ambient atmosphere and the well fluid in the separation tank increases in the morning, the second flow of gas to pump E ceases automatically after the temperature of the ambient atmosphere rises to said predetermined temperature.

Following is a detailed description of the structure of the present invention. The source of gas or air under pressure B is connected by a pipe 10 to the inlet side of the constant pressure outlet valve P. The outlet side 12 of valve P is connected by a tube 14 to a first T 16. T 16, by means of a tubing 18, is joined to a second T 20 from which a length of tubing 22 depends downwardly to a bleeder valve 24. Second T 20 is connected by tubing 26 to a third T 28. A gas discharge line 30 leads from T 28 to a needle valve 36 that is connected by tubing 34 to a fourth T 32. A length of tubing 38 extends from T 32 to the gas inlet 40 of pump E. After entering pump E and actuating same to discharge the treating chemical into line A in which the well fluid flows, the gas is discharged to the atmosphere or conducted to a disposal area (not shown).

Pump E is preferably mounted on a base 41 which also supports the reservoir F. The lower portion of reservoir F is in communication with a sight feed 42 from which a length of tubing 44 extends to a fitting 46 that defines both a passage (not shown) communicating with the treating chemical suction side of pump E as well as another passage (not shown) communicating with the treating chemical discharge side of the pump. Tubing 44 is, of course, so attached to fitting 46 as to be in communication with the treating chemical suction side of pump E. A tube 48 is so connected to fitting 46 as to be in communication with the treating chemical discharge side of pump E. Tube 48 extends to pipe A in which the well fluid flows, as shown. Third T 28 also has a tubing 50 extending therefrom to the inlet 52 of the normally closed valve G. When valve G starts to open, gas at constant presure from the reducing valve P then starts to flow therethrough to discharge into a tube 54. Tube 54 leads to a strainer 56 from which a tube 58 extends to T 32.

A tube 57 joins first T 16 to a suitable tubular fitting 58 on which a gas pressure gauge 60 is mounted to show the gas pressure in tube 57. Fitting 58 is connected by a tube 62 to a fifth T 64, which in turn is connected by tubing 66 to a compartment 68 forming a part of valve G. After entering compartment 68, gas under pressure communicates with a diaphragm 70 in a housing 72. The interior of compartment 68 and the portion of housing 72 above the diaphragm are connected by a tube 74. A vertically movable valve stem 76 is partially mounted in body 78 of valve G, which is at all times urged upwardly by two springs 80 and 82. However, the pressure of the gas above diaphragm 70 normally prevents such upward movement of stem 76, and the stem remains in a closed position to obstruct flow of gas from tube 50 to tube 54.

When the temperature of the ambient atmosphere falls below said predetermined level, the valve H which is thermostatically controlled by a bi-metallic member 84 that is exposed to the ambient atmosphere, begins to open. As valve H begins to open, the gas pressure in a branch line 86 increases and augments the force exerted by springs 80 and 82. This augmentation of the forces exerted by springs 80 and 82 causes the valve stem 76 to move upwardly, and the degree of movement is inversely proportional to the fall of the ambient temperature below said predetermined level. Of course, the greater the extent of upward movement of stem 76, the greater the second flow of gas will be through tube 54, and the greater the rate at which pump E operates to pump treating chemical line A from reservoir F.

When the temperature of the ambient atmosphere rises above said predetermined level, the bi-metallic member 84 causes the valve member H to assume a closed position whereby the pressure of gas above diaphragm 70 overcomes the forces exerted by springs 80 and 82 and causes valve stem 76 to move downwardly into a closed position. Pump E then operates at said first rate and discharges treating chemical to line A. From the standpoint of convenience, it has been found desirable to locate a pressure gauge 92 on branch line 86 to indicate the magnitude of the gas pressure therein.

The use and operation of the invention have been previously described in detail and need not be repeated.

Although the form of the invention herein shown and described is fully capable of achieving the objects and providing the advantages hereinbefore mentioned, it is to be understood to be merely the presently preferred embodiment thereof, and that there is no intention to limit said form to other than as defined in the appended claims.

I claim:

1. In an apparatus for continuously introducing a liquid treating chemical into the flow from an oil and gas well at a uniform rate above a predetermined temperature of the ambient atmosphere, but which automatically increases the rate of flow of said chemical in inverse proportion to the extent that the temperature of said ambient temperature decreases below said predetermined temperature, consisting of: a reservoir for said liquid treating chemical; a gas actuated reciprocating pump which discharges a liquid therefrom at a rate that is proportional to the rate at which a gas is supplied thereto; first means connecting said reservoir to a liquid chemical inlet side of said pump; second means connecting the liquid chemical discharge side of said pump to said flow from said well; a source of gas under uniform pressure; third means for supplying said gas from said source to said pump at a first rate of flow to actuate said pump to discharge said treating chemical into said flow from said well at said uniform rate; fourth means for controlling said rate to one suited for the particular treating chemical being used and the particular flow from an oil and gas well being treated; fifth means capable of permitting said gas to flow from said third means to said pump at a second variable rate of flow; and sixth means responsive to the temperature of the ambient atmosphere and operatively associated with said third and fifth means for maintaining said fifth means in a closed position when the temperature of the ambient atmosphere is above said predetermined temperature and which actuates said fifth means to allow said gas to flow therethrough at said second rate when the temperature of said ambient atmosphere falls below said predetermined temperature, which fifth and sixth means cooperatively allow said gas at said second rate of flow to increase in an inverse relationship to the extent that the temperature of said ambient atmosphere drops below said predetermined temperature.

2. An apparatus as defined in claim 1 wherein said third means is a pressure reducing valve and said fourth means is a manually operable valve.

3. An apparatus as defined in claim 2 wherein said fifth means is a normally closed diaphragm-operated throttling valve which is connected to said sixth means to receive gas at a varying pressure therefrom, with said sixth means permitting said gas to exert pressure on said diaphragm which varies inversely in proportion to the extent that the temperature of said ambient atmosphere drops below said predetermined level, which throttling valve opens in proportion to the increase in pressure on said diaphragm by said gas at said varying pressure.

4. An apparatus as defined in claim 3 wherein said sixth means is a thermostat-controlled valve that is closed when the temperature of said ambient atmosphere is above said predetermined temperature, said thermostat valve being connected to said third means, which thermostat-controlled valve supplies said gas to said fifth means at a pressure that increases in inverse proportion to the drop in temperature of said ambient atmosphere after it falls below said predetermined temperature.

References Cited in the file of this patent

UNITED STATES PATENTS

| | | |
|---|---|---|
| 1,617,737 | Averill | Feb. 15, 1927 |
| 1,802,090 | Roberts | Apr. 21, 1931 |
| 1,963,406 | Herbsman | June 19, 1934 |
| 2,221,169 | Raney et al. | Nov. 12, 1940 |
| 2,830,957 | Rhodes | Apr. 15, 1958 |
| 2,851,863 | Theed | Sept. 16, 1958 |